Jan. 12, 1960 K. R. BRONSON 2,920,672
CYLINDRICAL CRADLE WITH FLOATING NUT AND
SPRING PIN ASSEMBLY MEANS
Filed Sept. 17, 1954 3 Sheets-Sheet 1
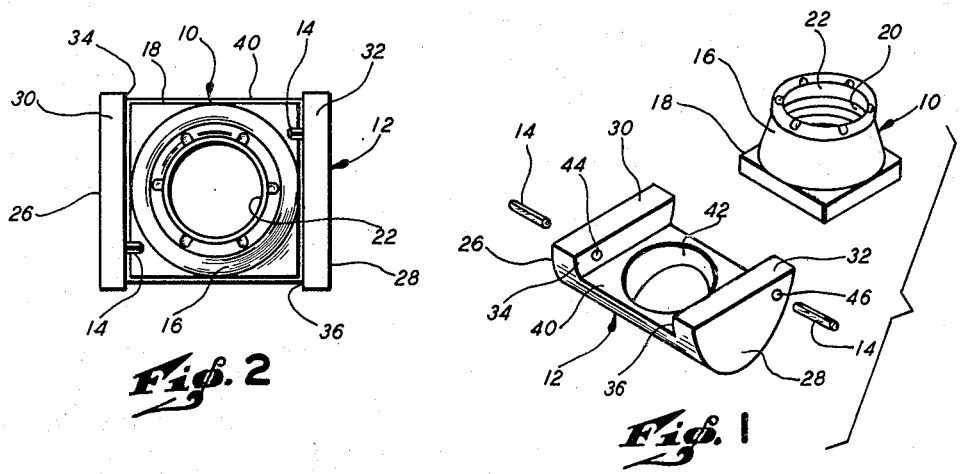
Fig. 2
Fig. 1
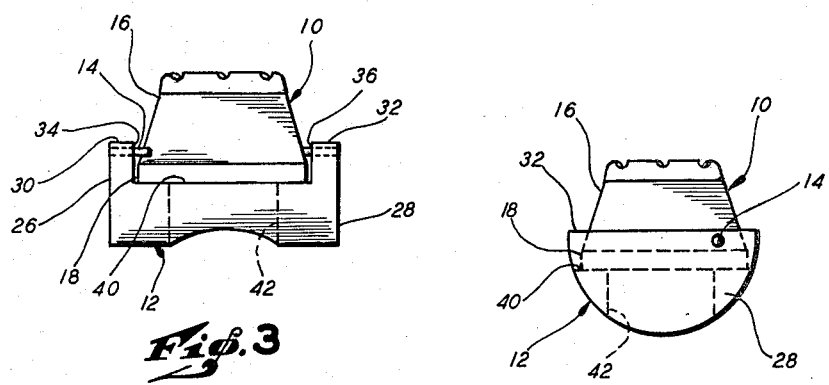
Fig. 3
Fig. 4
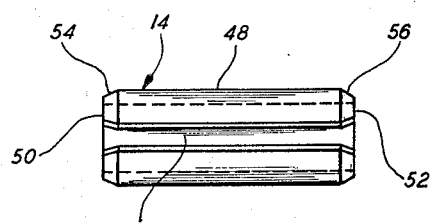
Fig. 5
INVENTOR.
KEITH R. BRONSON
BY Richard A. Craig
HIS ATTORNEY Jan. 12, 1960   K. R. BRONSON   2,920,672
CYLINDRICAL CRADLE WITH FLOATING NUT AND
SPRING PIN ASSEMBLY MEANS
Filed Sept. 17, 1954   3 Sheets-Sheet 2

INVENTOR.
KEITH R. BRONSON
BY Richard A. Craig
HIS ATTORNEY

Jan. 12, 1960　　　K. R. BRONSON　　　2,920,672
CYLINDRICAL CRADLE WITH FLOATING NUT AND
SPRING PIN ASSEMBLY MEANS
Filed Sept. 17, 1954　　　　　　　3 Sheets-Sheet 3

*INVENTOR.*
KEITH R. BRONSON
BY Richard A. Craig
HIS ATTORNEY

United States Patent Office 2,920,672
Patented Jan. 12, 1960

2,920,672

CYLINDRICAL CRADLE WITH FLOATING NUT AND SPRING PIN ASSEMBLY MEANS

Keith R. Bronson, Plainfield, N.J., assignor to Elastic Stop Nut Corporation of America, Union, N.J., a corporation of New Jersey Application September 17, 1954, Serial No. 456,712

2 Claims. (Cl. 151—41.76)

This invention pertains generally to fastening devices and more particularly to a nut having an internally threaded nut member and a cradle for holding the nut member so that a predetermined amount of relative movement between the parts is permitted. A nut in accordance with the invention may conveniently be called a floating barrel nut.

As used herein the term "nut" refers to a complete fastening device, while "nut member" denotes a component thereof.

Particularly in the aircraft industry it is often desired to join panels or plates in end-to-end fashion. One panel has a cylindrical bore therein and a first hole intersecting and perpendicular to the bore, and the other panel has a second hole therein designed to be axially aligned with the first hole when the panels are in position to be joined.

To effect the type of connection described above, a fastening device commonly called a barrel nut has been widely used. Such a barrel nut will be called herein a non-floating barrel nut, which typically includes a generally cylindrical body adapted for sliding fit in the bore and having an internally threaded opening, the cylinder axis being perpendicular to the thread axis. The body is inserted in the bore until the thread axis is aligned with the axis of the first hole, a bolt is inserted through the second and first holes into engagement with the threads, and the bolt is turned to advance threadedly relative to the body, which is prevented from rotating about the thread axis by virtue of the engagement of the body by the bore.

A non-floating barrel nut is generally satisfactory in use, except under one condition which has proved to be fairly common, namely, where the axes of the first and second holes are out of alignment in such a way that the misalignment has a component perpendicular to the plane defined by the bore and the first hole. Under that condition a non-floating barrel nut cannot be used.

Where the hole axes are misaligned in the plane defined by the axes of the bore and the first hole, compensation can usually be readily made by adjusting the depth of insertion of a non-floating barrel nut in the bore.

It is therefore an important object of this invention to provide a fastening device which is an improvement over a non-floating barrel nut, with which device compensation can be made for misalignment of the first and second holes, which misalignment cannot be compensated for with a non-floating barrel nut.

It is another object to provide a floating barrel nut having a cradle and a nut member with these parts being relatively movable with respect to each other.

It is a further object to provide a floating barrel nut having a cradle and a nut member movable with respect to the cradle to compensate for misalignment of the first and second holes, where the misalignment has a component perpendicular to the plane defined by the axes of the bore and the first hole.

It is still another object to provide a floating barrel nut which is of simple, inexpensive construction.

It is yet another object to provide a floating barrel nut which is lighter than a heretofore conventional non-floating barrel nut of the same size.

A device in accordance with a preferred form of the invention includes a cradle having a surface adapted for sliding fit in the bore and defining an axis and a second surface, and a nut member having a third surface adapted to slide on said second surface perpendicular to the axis. Means are also advantageously provided to retain the cradle and the nut member in assembled relationship.

The above and further objects and advantages will become more apparent from the following description taken with the accompanying drawings, in which:

Fig. 1 is a perspective view of a preferred embodiment of the invention, the parts being shown disassembled;

Fig. 2 is a plan view of the device of Fig. 1, the parts being shown assembled;

Fig. 3 is a side elevation of the device shown in Fig. 2;

Fig. 4 is an end view of the device as shown in Fig. 2;

Fig. 5 is an enlarged view of a component of the device;

Figure 6:
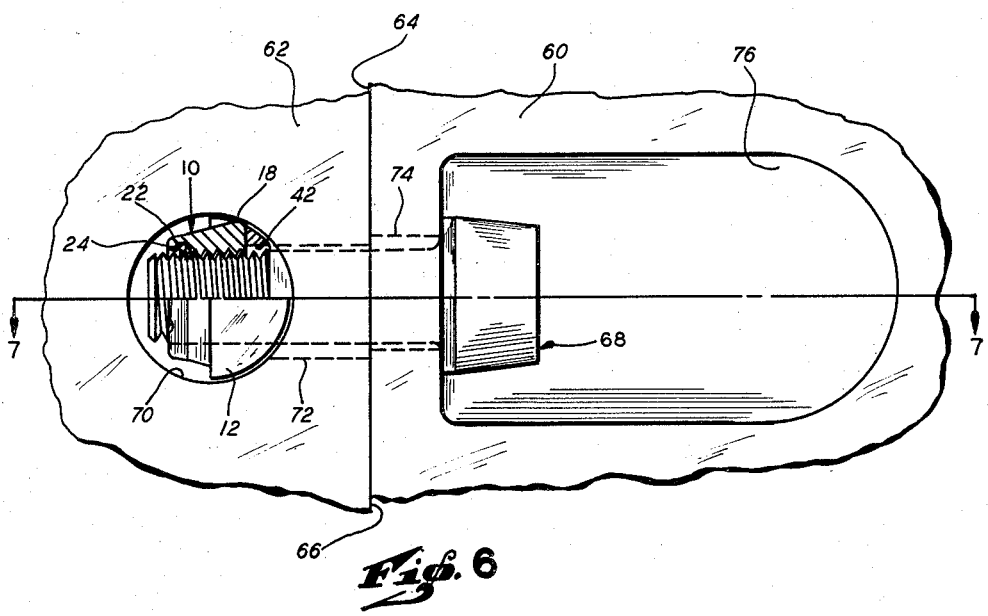
Fig. 6 is a view showing the device of Fig. 1 and related views in partly sectioned end view, assembled with a bolt to hold two panels together.

Reference is first made particularly to Figs. 1 through 5 which show a preferred embodiment of the invention including a nut member 10, a cradle 12 and two retaining pins 14.

Nut member 10 has a body 16 and an integral base 18. Body 16 may be of any desired configuration, and as shown is frusto-conical. Base 18 is square, but it too can assume any of a variety of shapes. Nut member 10 is provided with a threaded bore 20 the axis of which coincides with the axis of body 16 and is perpendicular to the bottom surface of base 18, passing through its center. As may be seen particularly in Fig. 6, nut member 10 may be of the self-locking type, by which is meant that the nut member will grip a screw or bolt with sufficient frictional contact to require appreciable torque to turn the bolt through the nut. The frictional engagement is obtainable in different ways, but a satisfactory method is for the nut member to embody the principles of the invention disclosed in U.S. Patent No. 1,550,282, granted to T. G. Rennerfelt August 18, 1925. The illustrated nut member embodies these principles, including an annular locking insert 22 of washer-like form secured in a suitable recess 24 at the end of nut body 16 remote from nut base 18. The insert is advantageously made of vulcanized fiber or other relatively soft elastic thread impressionable material, for example nylon, as disclosed in U.S. Patent No. 2,540,694 granted to J. A. Sauer on October 5, 1948. Whatever the material, the insert is initially unthreaded, a thread being impressed, not cut therein by the bolt. Due to the action of the locking insert, nut member 10 is constantly maintained in frictional gripping relation on the bolt so as to require an appreciable torque to turn the bolt relative to the nut. The self-locking feature may also be attained in other ways.

Cradle 12 is of a particular configuration which may be described as what is left of a cylindrical rod after the following operations: (*a*) cut to proper length along planes perpendicular to the axis of the cylinder; (b) cut the resultant in two along a plane parallel to and substantially including the axis of the cylinder, the resultant thus having end surfaces 26 and 28; (c) mill out a recess from the plane mentioned in operation b, the bottom of the recess being parallel to that plane and the ends of the recess being parallel to surfaces 26 and 28, thus leaving surfaces 30 and 32 lying in the plane mentioned in operation b, producing surfaces 34 and 36 parallel to surfaces 26 and 28 and defining the ends of the recess, and producing surface 40 defining the bottom of the recess, surface 40 being of substantially square shape; (d) drill bolt clearance hole 42 through cradle 12, with the hole axis perpendicular to surface 40 at its center; and (e) drill holes 44 and 46 perpendicular to and joining surfaces 26 and 34, and 28 and 36, respectively, holes 44 and 46 being located a predetermined equal distance above surface 40 and equidistant from and on either side of a plane perpendicular to surface 26 and including the axis of hole 42.

A retaining pin 14 is clearly illustrated in Fig. 5 as a spring pin of the dowel pin type, including a spring metal cylinder 48 having ends 50 and 52 having chamfers 54 and 56, and a slot 58 parallel to the axis of the cylinder 48 and extending from end 50 to end 52. Such a pin is simply driven into a hole drilled to normal production tolerances, the hole being of slightly smaller diameter than the normal outside diameter of the pin, so that the pin is slightly compressed when inserted in the hole. Due to this compression the pin then exerts constant force against the hole wall, to retain the pin in place until deliberately removed, as by a hammer and a punch.

To assemble the parts, nut member 10 is placed with its base 18 engaging cradle surface 40, and the two pins 14 are driven into the holes 44 and 46 until the outer ends of pins 14 are flush with surfaces 26 and 28. The device thus produced permits nut member 10 predetermined amounts of freedom both lengthwise and crosswise of cradle 12, and opposite sides of base 18 are positioned for engagement by surfaces 34 and 36 to render nut member 10 self-wrenching.

While it does permit some float of nut member 10 lengthwise of cradle 12, the clearance between the sides of nut member base 18 and surfaces 34 and 36 is chosen primarily to prevent nut member 10 from binding between those surfaces. Such binding could prevent the desired float of nut member 10 crosswise of cradle 12.

The primary function of pins 14 is to prevent nut member 10 from becoming separated from cradle 12, although under certain circumstances the inner ends of pins 14 may also limit the float of nut member 10 crosswise of cradle 12. The limitation on the float of nut member 10 will be discussed more fully hereinafter.

To attain the desired results, certain dimensional relationships must or should be observed in designing the example of the invention illustrated in Fig. 1 and related views. For example, the distance between cradle surfaces 34 and 36 should be slightly greater than the length of the side of nut base 18 to prevent nut member 10 from binding as aforesaid; the depth of the cradle recess should be such that surface 40 will be wider than nut member base 18, so that substantially all of base 18 will engage surface 40 at all times; the height of nut member base 18 should be at least slightly less than the height of surfaces 34 and 36; holes 44 and 46 must be located a distance above cradle surface 40 which is slightly greater than the height of nut base 18 to insure trouble-free assembly of the parts and further to insure that pins 14 will not bear against the top of nut base 18 thus avoiding the possibility that base 18 be bound between pins 14 and cradle surface 40; holes 44 and 46 must be of diameter slightly less than the normal unstressed outside diameter of the pins 14; the length of pins 14 must be greater than the distance between cradle surfaces 26 and 34 and between surfaces 28 and 36 by a predetermined amount, so that pins 14 overlap cradle surface 40 by a predetermined amount when the pins 14 are driven into holes 44 and 46 as aforesaid; holes 44 and 46 must be separated by a distance less than the length of the square nut base 18 to prevent nut member 10 from coming loose from cradle 12; nut member body 16 is dimensioned so that it is overlapped by the inner ends of pins 14 to permit nut member 10 to move crosswise of cradle 12; and the diameter of hole 42 must be larger than the diameter of nut bore 20.

Figures 7, 8:
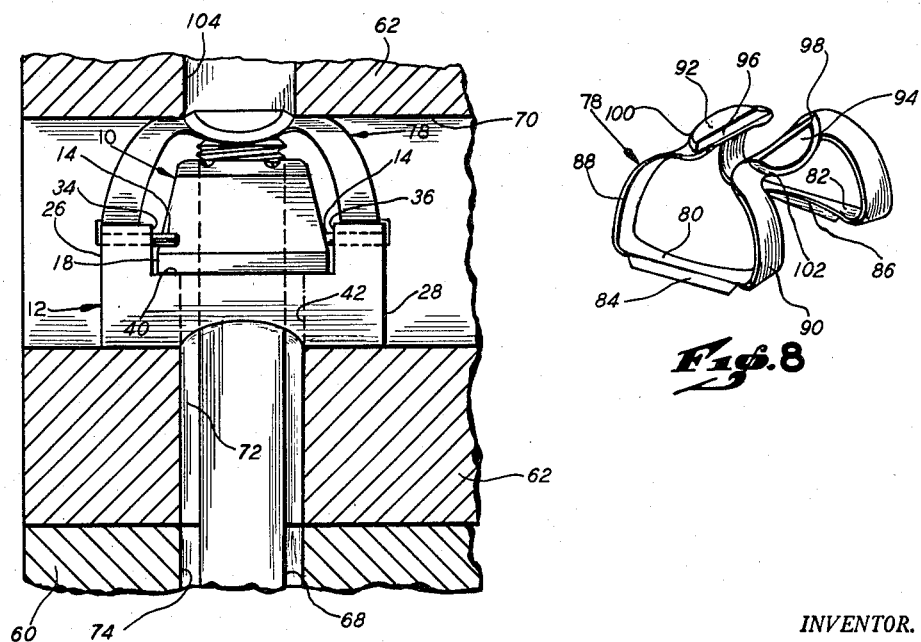
Fig. 7 is a sectional view taken on line 7—7 of Fig. 6 (on slightly enlarged scale) and showing a retainer for locating the fastening device properly in the bore.
Fig. 8 is a perspective view of the retainer.
Figure 9:
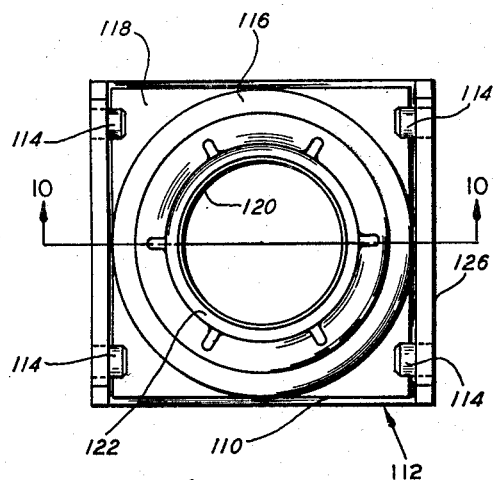
Fig. 9 is a plan view of a modified form of the invention.
Figure 12:
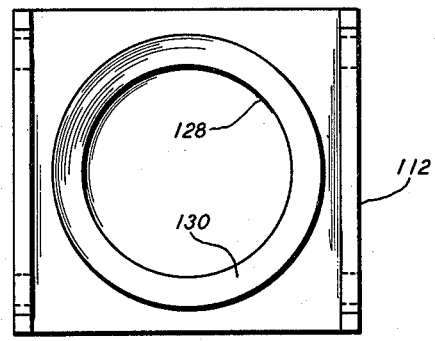
Fig. 12 is a plan view of one of the parts of the modification.
Figure 10:
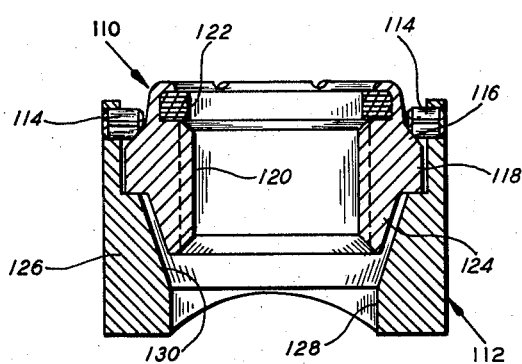
Fig. 10 is a sectional view taken on line 10—10 of Fig. 9.
Figure 11:
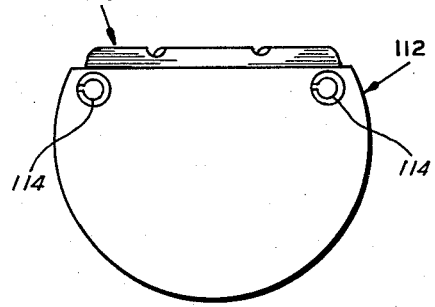
Fig. 11 is an end view of the device of Figs. 9 and 10.

Figs. 6 and 7 illustrate a typical application of the device, in which panels 60 and 62 are joined along confronting surfaces 64 and 66 by means of a threaded bolt 68 and the device illustrated in Fig. 1 and related views. Panel 62 is provided with a bore 70 of diameter sufficient for sliding fit therein of cradle 12. A bolt clearance hole 72 joins surface 66 and bore 70, with its axis perpendicular to the axis of bore 70. Bore 70 is of sufficient depth so that it is possible axially to align holes 42 and 72. Panel 60 contains a bolt clearance hole 74 the axis of which is perpendicular to the axis of bore 70 when panels 60 and 62 are positioned to be joined. Hole 74 extends from surface 64 to a recess 76 in an accessible surface of panel 60. Recess 76 is of sufficient length in the direction of the axis of hole 74 to receive bolt 68. Ideally, when panels 60 and 62 are positioned to be joined, clearance holes 72 and 74 are coaxial. Holes 42, 72 and 74 as illustrated have the same diameter, though this is a matter of choice.

At any rate, when panels 60 and 62 are positioned to be joined, the device of the invention is inserted in bore 70, bolt 68 is inserted in recess 76 with its threaded end facing panel 62, bolt 68 is advanced through holes 74, 72 and 42 and then rotated by a suitable tool into threaded engagement with the threads of nut member 10, thus to fasten panels 60 and 62 together.

The device can conveniently be inserted in bore 70 with holes 42 and 72 aligned and retained in that position until bolt 68 engages the nut threads by means of a retainer 78 as shown in Figs. 7 and 8. Clip 78 is of one-piece resilient sheet metal and includes horizontal flat coplanar end portions 80, 82 with depending tabs 84, 86 and upstanding arms 88, 90 joining one end of end portion 80 with the corresponding end of end portion 82. Looked at from the end of retainer 78, arms 88, 90 have a substantially arcuate configuration roughly completing the circle defined by the end of the cradle 12. The midportions of arms 88, 90 confront each other and are provided with shallow cup-shaped projections 92, 94 having confronting flat sides 96, 98 and substantially semi-circular sides 100, 102. Projections or detents 92, 94 lie outside the last mentioned circle.

The midportions of arms 88, 90 are positioned to permit flexure of arms 88, 90 to increase the length of clip 78 in such a manner that by placing clip 78 with tabs 84, 86 on a flat surface and depressing the midportions of arms 88, 90 tabs 84, 86 will move further from each other than when clip 78 is unstressed.

More precisely clip 78 is dimensioned so that when unstressed the distance between tabs 84, 86 is slightly less than the length of cradle 12 so that retainer 78 can be placed with tab 84 overlapping cradle surface 26 and tab 86 resting on cradle surface 32, so that when the midportions of arms 88, 90 are depressed, retainer 78 will flex, permitting tab 86 to slide along surface 32 until surface 28 is reached. Tab 86 then passes from surface 32 onto surface 28 in a snap-like action. In this condition, end portions 80, 82 engage cradle surfaces 30, 32 and tabs 84, 86 engage cradle surfaces 26, 28, all respectively. Thus retainer 78 grips cradle 12 frictionally due to restoring stress set up in retainer 78. Furthermore, with retainer 78 assembled with cradle 12, projections 92, 94 are symmetrically disposed with respect to the axis of retainer hole 42.

Sides 100, 102 of projections 92, 94 conform to hole 104 in member 62, hole 104 being coaxial with hole 72 and conveniently a continuation thereof on the other side of bore 70.

When the fastening device with retainer 78 attached is inserted in bore 70, projections 92, 94 engage the wall of bore 70 causing arms 88, 90 to be flexed inward, toward each other, slightly reducing the size of the circle defined by sides 100, 102. The insertion is continued until projections 92, 94 enter hole 104 reducing the inward stress in arms 88, 90. This relief allows arms 88, 90 to recede from each other, forcing projections 92, 94 into hole 104 with sides 100, 102 engaging the wall of hole 104.

Thus cradle 12 is held in bore 70 with hole 42 aligned with hole 72.

As shown in Fig. 6, holes 72 and 74 are misaligned in a direction crosswise of cradle 12 and nut member 10 has shifted to overcome the misalignment. The maximum float as shown is determined by the wall of bore 70. No misalignment is shown in Fig. 7, which shows retainer 78. For reasons of clarity, retainer 78 is not shown in Fig. 6.

Nut member 10 is advantageously made of steel, cradle 12 of aluminum and the pins 14 of steel. For certain applications in which the nut is to be subjected to temperature too great to be withstood by aluminum without loss of strength, the cradle may be of steel. Where it is possible to use an aluminum cradle a substantial saving in weight is achieved, which is not possible with the heretofore conventional non-floating barrel nuts.

While certain embodiments of the invention may be used in which the nut member base is not square, the illustrated square base 18 gives a greater bearing area between nut member 10 and cradle 12 and hence as between these two parts distributes tensile load over a greater area, thereby subjecting the parts to a minimum amount of load per unit area for a given size nut.

Figs. 9, 10, 11 and 12 illustrate a modified form of the invention with which it is possible to carry high loads and yet fit in a smaller bore than other forms of the invention. This modification consists of six parts, namely, a nut member 110, a cradle 112 and four pins 114.

Nut member 110 is similar to nut member 10, having a frusto-conical body 116, a square base 118 to support member 110 and provide the self-wrenching feature, a threaded bore 120 and a self-locking collar 122.

The major difference between nut members 10 and 110 is that the latter has a frusto-conical extension 124 extending from base 118, extension 124 being coaxial with the remainder of member 110 and containing an extension of threaded bore 120; whereas nut member 10 is flat across the bottom.

Cradle 112 is similar to cradle 12, including a recessed cylindrical body 126 having a bolt clearance hole 128 the axis of which is perpendicular to the bottom of the recess. The major difference between cradles 12 and 112 is that in the latter, clearance hole 128 is countersunk as indicated at 130 to accommodate extension 124 of nut member 110 with a predetermined amount of "float." As shown the amount of float is determined by the clearance between extension 124 and countersunk portion 130.

Four pins 114 hold nut member 110 and cradle 112 together as an assembly, but as shown do not limit the float. Pins 114 are held in four holes through the ends of cradle 112, the inner ends of pins 114 overlapping base 118 of nut member 110.

Again, nut member 110 is permitted some movement between the end walls of cradle 112 but this freedom is primarily to prevent member 110 from binding against cradle 112 and not primarily to attain float.

Most barrel nuts are used in tension joints. In the modification shown in Figs. 9 through 12 extension 124 will be under tension, rather than under compression as is all of nut member 10. This feature of nut member 110 provides more uniform bolt loading, to permit higher bolt loading without danger of fatigue failure.

Another important distinction between the device of Figs. 1 through 5 and that of Figs. 9 through 12 is that the top of nut member 110 is considerably smaller, that is, less high, than the top of nut member 10. Maximum stress in a nut occurs just above the plane of support, and in the device of Figs. 9 through 12 nut member 110 is supported near its center to provide a stress distribution to match this geometry.

Nut member 110 and cradle 112 may be made of heat treated alloy steel to give the nut maximum strength at a minimum size and weight.

For some applications, a non-self-locking nut member is sufficient, and the invention is therefore not limited to devices including the self-locking feature.

From the foregoing it will be apparent that by utilizing the principles of the invention, numerous advantages are attainable and that they may be incorporated in fastening devices of forms other than the specific form described and illustrated herein by way of example. The invention accordingly embraces all devices falling within the scope of the appended claims.

I claim:

1. A fastening device comprising a threaded nut member including a square base portion having a flat surface perpendicular to the thread axis and an annular portion upstanding from said base portion, a cradle having a cylindrical external surface adapted for sliding fit in a bore in a work panel, a flat surface parallel to the axis of said cylindrical surface and intersecting said cylindrical surface, first and second end walls providing a pair of confronting parallel surfaces perpendicular to the axis of said cylindrical surface and intersecting said flat cradle surface, said confronting surfaces and said flat cradle surface defining a recess across said cradle, said base portion located in said recess between said confronting surfaces and said flat surfaces confronting each other and adapted for relative sliding movement, a first hole through said first end wall and a second hole through said second end wall, said holes on opposite sides of a plane perpendicular to said flat cradle surface and including the axis of said cylindrical surface, and first and second cylindrical, rolled, radially contractable spring metal pins frictionally engaging the walls of said first and second holes, respectively, and parallel to the axis of said cylindrical surface, each said pin having a retaining portion including a free end, each said retaining portion overlying said flat cradle surface and said base portion, said free end of said first pin spaced from said surface of said first end wall a distance greater than the maximum distance between said surface of said first end wall and that part of said annular portion of said nut member closest to said surface of said first wall at the axial location of said annular portion corresponding to said first pin and said free end of said second pin spaced from said surface of said second end wall a distance greater than the maximum distance between said surface of said second wall and that part of said annular portion closest to said surface of said second wall at the axial location of said annular portion corresponding to said second pin, thus to maintain said nut member and said cradle as an assembly.

2. A fastening device comprising a threaded nut member including a square base portion having a flat surface perpendicular to the thread axis, a first annular portion upstanding from said base portion and a second annular portion depending a predetermined distance from said flat surface and having a tapered external surface, a cradle having a cylindrical external surface adapted for sliding fit in a bore in a work panel, a flat surface parallel to the axis of said cylindrical surface and intersecting said cylindrical surface, first and second end walls providing a pair of confronting parallel surfaces perpendicular to the axis of said cylindrical surface and intersecting said flat cradle surface, said confronting surfaces and said flat cradle surface defining a recess across said cradle and a bolt clearance opening extending from said flat cradle surface through said cradle to said cylindrical surface and having a countersunk portion at the end thereof remote from said cylindrical surface, said base portion located in said recess between said confronting surfaces and said flat surfaces confronting each other and adapted for relative sliding movement and said second annular portion in said countersunk portion of said clearance opening, a first hole through said first end wall and a second hole through said second end wall, said holes on opposite sides of a plane perpendicular to said flat cradle surface and including the axis of said cylindrical surface, and first and second cylindrical, rolled, radially contractable spring metal pins frictionally engaging the walls of said first and second holes, respectively, and parallel to the axis of said cylindrical surface, each said pin having a retaining portion including a free end, each said retaining portion overlying said flat cradle surface and said base portion in all relative positions of said nut member and said cradle, said free end of said first pin spaced from said surface of said first end wall a distance greater than the maximum distance between said surface of said first end wall and said base portion and said free end of said second pin spaced from said surface of said second end wall a distance greater than the maximum distance between said suface of said second end wall and said base portion, the distance perpendicular to said flat cradle surface between each said pin and said base portion being less than said predetermined distance, thus to maintain said nut member and said cradle as an assembly.

References Cited in the file of this patent
UNITED STATES PATENTS

| | | |
|---|---|---|
| 167,118 | Pritchett | Aug. 24, 1875 |
| 1,398,325 | Ivory | Nov. 29, 1921 |
| 1,671,757 | Allen | May 29, 1928 |
| 2,120,462 | Ferguson | June 14, 1938 |
| 2,144,350 | Swanstrom | Jan. 17, 1939 |
| 2,144,553 | Simmonds | Jan. 17, 1939 |
| 2,361,979 | Tarwater | Nov. 7, 1944 |
| 2,596,056 | Tinnerman | May 6, 1952 |
| 2,648,247 | Schmuziger | Aug. 11, 1953 |
| 2,809,686 | Shepherd | Oct. 15, 1957 |
| 2,825,379 | Becker | Mar. 4, 1958 |

OTHER REFERENCES

Elastic Stop Nut Brochure, ADL 5208 on Rolpins.